Nov. 4, 1924.                                                    1,514,444
C. F. DUCHANOIS
TERMINAL CONNECTION FOR CHARGING STORAGE BATTERIES
Filed July 10, 1919
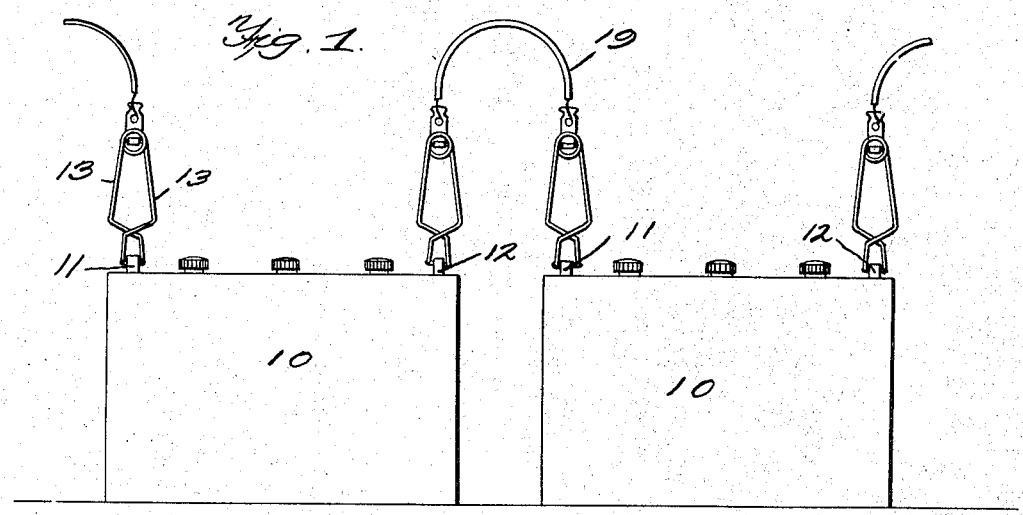
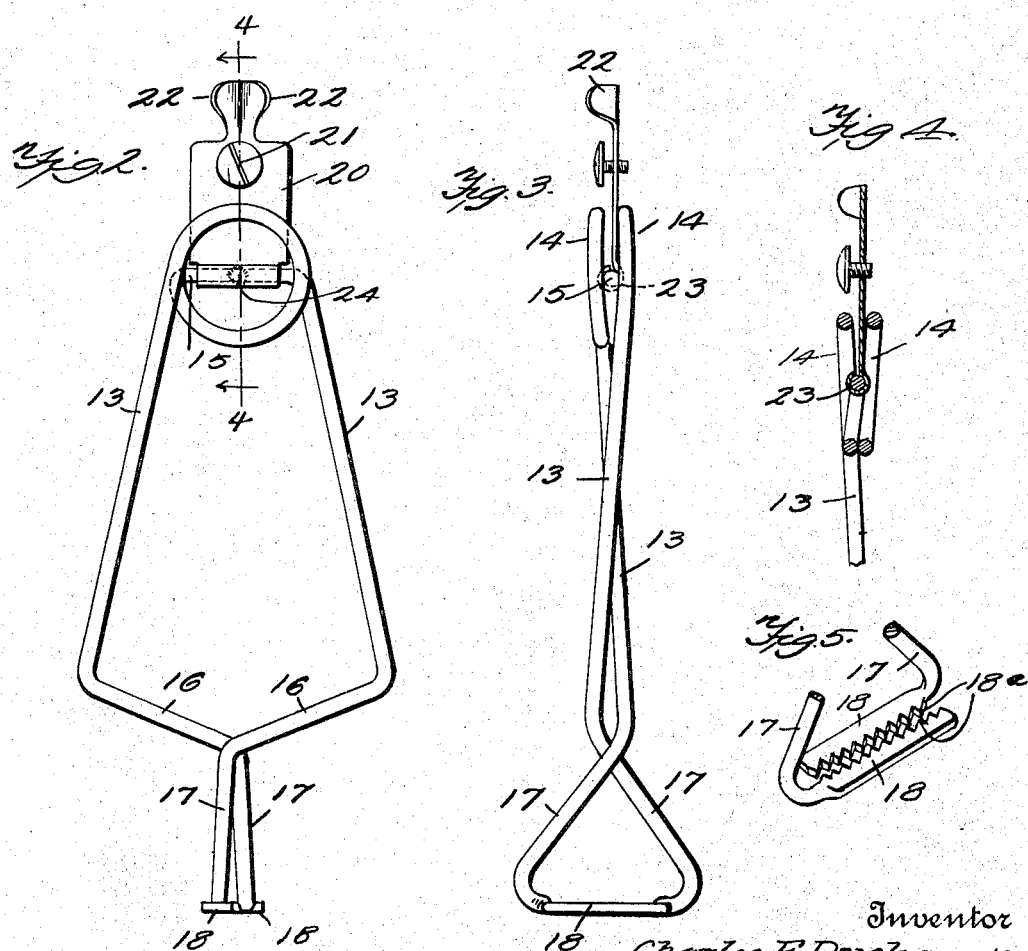
Inventor
Charles F. Duchanois Patented Nov. 4, 1924.

1,514,444

UNITED STATES PATENT OFFICE.

CHARLES F. DUCHANOIS, OF YOUNGSTOWN, OHIO.

TERMINAL CONNECTION FOR CHARGING STORAGE BATTERIES.

Application filed July 10, 1919. Serial No. 309,907.

*To all whom it may concern:*

Be it known that I, CHARLES F. DUCHANOIS, a citizen of the United States, residing at Youngstown, in the county of Mahoning and State of Ohio, have invented certain new and useful Improvements in Terminal Connections for Charging Storage Batteries, of which the following is a specification.

My invention relates to improvements in terminal connections, adapted for engagement with the electrodes of storage batteries, for charging the same.

An important object of the invention is to provide a device of the above-mentioned character, which is simple in construction, convenient and reliable in use, not easily accidentally disposed or removed, and durable.

A further object of the invention is to provide a device of the above mentioned character, adapted for engagement with electrodes of different shapes.

Other objects and advantages of the invention will be apparent during the course of the following description.

The ordinary terminal connection employed in charging storage batteries, consists of a pair of separate members connected near their upper ends. The jaws are formed upon the opposite ends of these members, and portions of the members are crossed near or at the jaws. A compressible coil spring is usually arranged between the members and near the jaws.

It has been found that a device of this character is open to serious objections. By forming the device in two separate members, there is more or less an insulating effect produced at the connection of these members, which causes a considerable amount of current to flow through the spring, heating the same, and destroying its temper, so that it loses its resiliency. Further by having this spring located near the jaws, it receives thereon, the fine particles of sulfuric acid, which are continuously sprayed upwardly from the battery, by the ascending currents of hydrogen. The spring is thus quickly destroyed, and as a result of this, the device frequently becomes disconnected from the electrode of the battery.

As is well known, storage batteries are charged for a definite period, such as a suitable number of hours, and the attendant applies the devices to the batteries for connecting them in circuit. When the attendant leaves the batteries, thus connected, the ordinary device not infrequently disconnects therefrom, and when the attendent returns, it is impossible to ascertain just how long the circuit has been open or the batteries have been or are to be charged.

In accordance with my invention, I provide a terminal connection which is formed entirely of a single section of wire of suitable stiffness and resiliency, and the wire is bent upon itself to provide oppositely arranged members, of substantial length. At the upper or outer ends of the members the wire is coiled into a torsional spring and at their inner ends, relatively long jaws are provided, adapted to have the maximum clamping engagement with the electrodes of the storage battery.

By locating the coil spring at a point remote from the storage battery, the ascending particles of sulfuric acid do not attack the same or weaken it. By forming the device of a single piece of wire, there is no detrimental action upon the coil spring, due to the passage of current therethrough.

In the accompanying drawings forming a part of this specification and in which like numerals are employed to designate like parts throughout the same, Figure 1 is a side elevation of two storage batteries, showing my terminal connection secured to the electrodes thereof and connecting the same in series;

Figure 2 is a side elevation of the terminal connection;

Figure 3 is an edge elevation of the same;

Figure 4 is a section, taken on the line 4—4 of Figure 2; and

Figure 5 is a perspective of the attaching jaws.

Referring now more particularly to the drawings, wherein for the purpose of illustration is shown the preferred embodiment of my invention, the numeral 10 designates storage batteries of any well known or preferred type, each of which is provided with positive and negative electrodes 11 and 12.

My terminal connection is formed of a single section of suitably stiff resilient wire which is bent between its ends to form opposed arms or members 13. At the upper end of these arms 13 the wire is bent to form a torsional coil spring 14 of a plurality of turns, the connection of the turns being substantially diametrically disposed of the coils and forming a support 15 for a purpose hereinafter to appear.

The arms are relatively long, and are provided at their lower ends with approximately horizontal shoulders or extensions 16 projecting toward and crossing one another. The extensions 16 carry depending shanks 17, and these shanks are oppositely bent at their lower ends to provide substantially horizontal jaws 18 of substantial length. These jaws are provided upon their inner faces with serrations forming relatively sharp teeth 18ª.

The numeral 19 designates a wire, which is secured to a strip 20 by a binding screw 21, the wire having a portion thereof passed through the sleeve formed by ears 22 of the strip. The lower end 23 of the strip is bent about the support 15 and spot-welded or otherwise secured thereto, as at 24. The body of the strip 20 extends upwardly intermediate the coils 14 of the arms 13.

In the use of the device, the arms or members 13 are moved inwardly against the action of the spring whereby the extensions and jaws 18 are moved outwardly, so that the jaws may be positioned upon the opposite sides of the electrodes 12. These electrodes being rectangular in cross section, the sharp teeth on the inner faces of the jaws engage with the outer face of the eslectrode substantially throughout its entire area and create a powerful binding action. In many cases the electrode is incrusted with the electrolyte of the battery and a slight movement of the jaws upon the face of the electrode will cause the teeth 18ª to cut through this incrustation and firmly engage the electrode.

The binding action obtained by the gripping of the teeth and the substantial length of the jaws 18 is very important in that it prevents the device from tipping upon the electrode and hence overcomes the liability of disconnection or short circuiting by contact with some conducting body. When the device is applied to an electrode on account of the substantial length of the arms 13, the spring is positioned a sufficient distance from the electrolyte of the battery as to much lessen its liability of being contacted by the acid content thereof which is often discharged in a fine spray from the battery when the same is being charged.

It is to be understood that the form of my invention herewith shown and described is to be taken as the preferred example of the same, and that various changes in the shape, size and arrangement of parts may be resorted to without departing from the spirit of the invention or the scope of the subjoined claims.

Having thus described my invention, I claim:

1. A terminal connection for engagement with the electrodes of a storage battery in charging the same, formed of suitably stiff and resilient wire which is bent upon itself for providing oppositely arranged arms, said wire being bent at the upper ends of the arms to form a torsional coil spring and a portion of the wire extending diametrically of the coil of the spring, said arms carrying jaws at their opposite ends, a plate having one end bent to surround the diametrically disposed portion of the wire, and means for connecting the wire with the plate.

2. A terminal connection for engagement with the electrodes of a storage battery in charging the same, formed of suitably stiff and resilient wire which is arranged to provide oppositely disposed arms, said wire being extended at the upper ends of the arms to form a torsional coil spring, a portion of the wire extending diametrically of the coil, jaws arranged on the lower ends of said arms, a plate having one end shaped to form a sleeve adapted to surround the diametrically disposed portion of the wire, and means for connecting a lead wire to the plate.

3. A terminal connection for engagement with the electrodes of a storage battery in charging the same formed of suitably stiff and resilient wire which is bent upon itself to provide oppositely arranged arms, said wire being bent at the upper ends of the arms to form a torsional coil spring, a portion of the wire extending diametrically of the coil of the spring, said arms carrying jaws at their opposite ends, and means for connecting a lead wire to the diametrically extending portion of the coil.

In testimony whereof I affix my signature.

CHARLES F. DUCHANOIS.